US012625636B2

(12) United States Patent
Wilson et al.

(10) Patent No.: US 12,625,636 B2
(45) Date of Patent: **\*May 12, 2026**

(54) REPAIR OPERATION TECHNIQUES

(71) Applicant: Micron Technology, Inc., Boise, ID (US)

(72) Inventors: Alan J. Wilson, Boise, ID (US); Donald M. Morgan, Meridan, ID (US)

(73) Assignee: Micron Technology, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/806,210

(22) Filed: Aug. 15, 2024

(65) Prior Publication Data

US 2025/0053327 A1      Feb. 13, 2025

Related U.S. Application Data

(63) Continuation of application No. 17/983,213, filed on Nov. 8, 2022, now Pat. No. 12,086,449, which is a (Continued)

(51) Int. Cl.
| | |
|---|---|
| *G06F 12/00* | (2006.01) |
| *G06F 3/06* | (2006.01) |
| *G06F 12/10* | (2016.01) |

(52) U.S. Cl.
CPC .......... *G06F 3/0647* (2013.01); *G06F 3/0616* (2013.01); *G06F 3/0659* (2013.01); (Continued)

(58) Field of Classification Search
CPC .... G06F 3/0647; G06F 3/0616; G06F 3/0659; G06F 3/0673; G06F 12/10; G06F 2212/657
See application file for complete search history.

(56) References Cited

U.S. PATENT DOCUMENTS

| | | | |
|---|---|---|---|
| 2004/0145933 A1* | 7/2004 | Yamane | G11C 29/56004 365/45 |
| 2007/0067706 A1 | 3/2007 | Azimane et al. | |

(Continued)

FOREIGN PATENT DOCUMENTS

| | | |
|---|---|---|
| WO | 2012/106085 A2 | 8/2012 |

OTHER PUBLICATIONS

"International Search Report and Written Opinion of the International Searching Authority," issued in connection with Int'l Appl. No. PCT/US2022/070762 dated, dated May 31, 2022, 9 pages.

*Primary Examiner* — Shawn X Gu
(74) *Attorney, Agent, or Firm* — Holland & Hart LLP

(57) ABSTRACT

Methods, systems, and devices for repair operation techniques are described. A memory device may detect a failure of a read operation associated with a physical row address of a memory die. The memory device may store information associated with the physical row address before performing a media management operation and after detecting the failure. Additionally or alternatively, the memory device may initiate a counter based on detecting the failure and may increment a value of the counter for each media management operation performed after detecting the failure. The memory device may send a command or other information to perform a repair operation for the physical row address. The memory device may determine the physical row address for the repair operation (e.g., despite media management operations) based on the stored information or the value of the counter, and may perform the repair operation on the physical row address.

20 Claims, 8 Drawing Sheets

Related U.S. Application Data continuation of application No. 17/197,733, filed on Mar. 10, 2021, now Pat. No. 11,507,296.

(52) U.S. Cl.
CPC ............ *G06F 3/0673* (2013.01); *G06F 12/10* (2013.01); *G06F 2212/657* (2013.01)

(56) References Cited

U.S. PATENT DOCUMENTS

| | | | | |
|---|---|---|---|---|
| 2010/0161882 | A1* | 6/2010 | Stern | G06F 12/10 |
| | | | | 714/763 |
| 2011/0302358 | A1* | 12/2011 | Yu | G06F 11/108 |
| | | | | 711/E12.008 |
| 2014/0189284 | A1 | 7/2014 | Hyuseinova et al. | |
| 2015/0100850 | A1 | 4/2015 | Lee et al. | |
| 2016/0239379 | A1 | 8/2016 | Fee et al. | |
| 2016/0313929 | A1* | 10/2016 | Harrand | G06F 3/0629 |
| 2017/0168892 | A1* | 6/2017 | Roh | G06F 3/061 |
| 2018/0039578 | A1 | 2/2018 | Yun et al. | |
| 2019/0050153 | A1* | 2/2019 | Yang | G11C 16/26 |
| 2019/0087324 | A1 | 3/2019 | Takeda et al. | |
| 2019/0095133 | A1* | 3/2019 | Grannaes | G06F 12/0246 |
| 2019/0272115 | A1* | 9/2019 | Hu | G06F 3/0647 |
| 2020/0090729 | A1 | 3/2020 | Son et al. | |
| 2020/0097394 | A1* | 3/2020 | Eno | G11C 16/3495 |
| 2020/0151070 | A1 | 5/2020 | Lee et al. | |
| 2020/0167231 | A1 | 5/2020 | Kim et al. | |
| 2020/0241764 | A1 | 7/2020 | Chen et al. | |
| 2020/0387456 | A1 | 12/2020 | Kang et al. | |
| 2021/0026728 | A1 | 1/2021 | Kim et al. | |
| 2022/0180958 | A1* | 6/2022 | Kim | G11C 29/18 |
| 2022/0229563 | A1 | 7/2022 | Choi | |

* cited by examiner

200

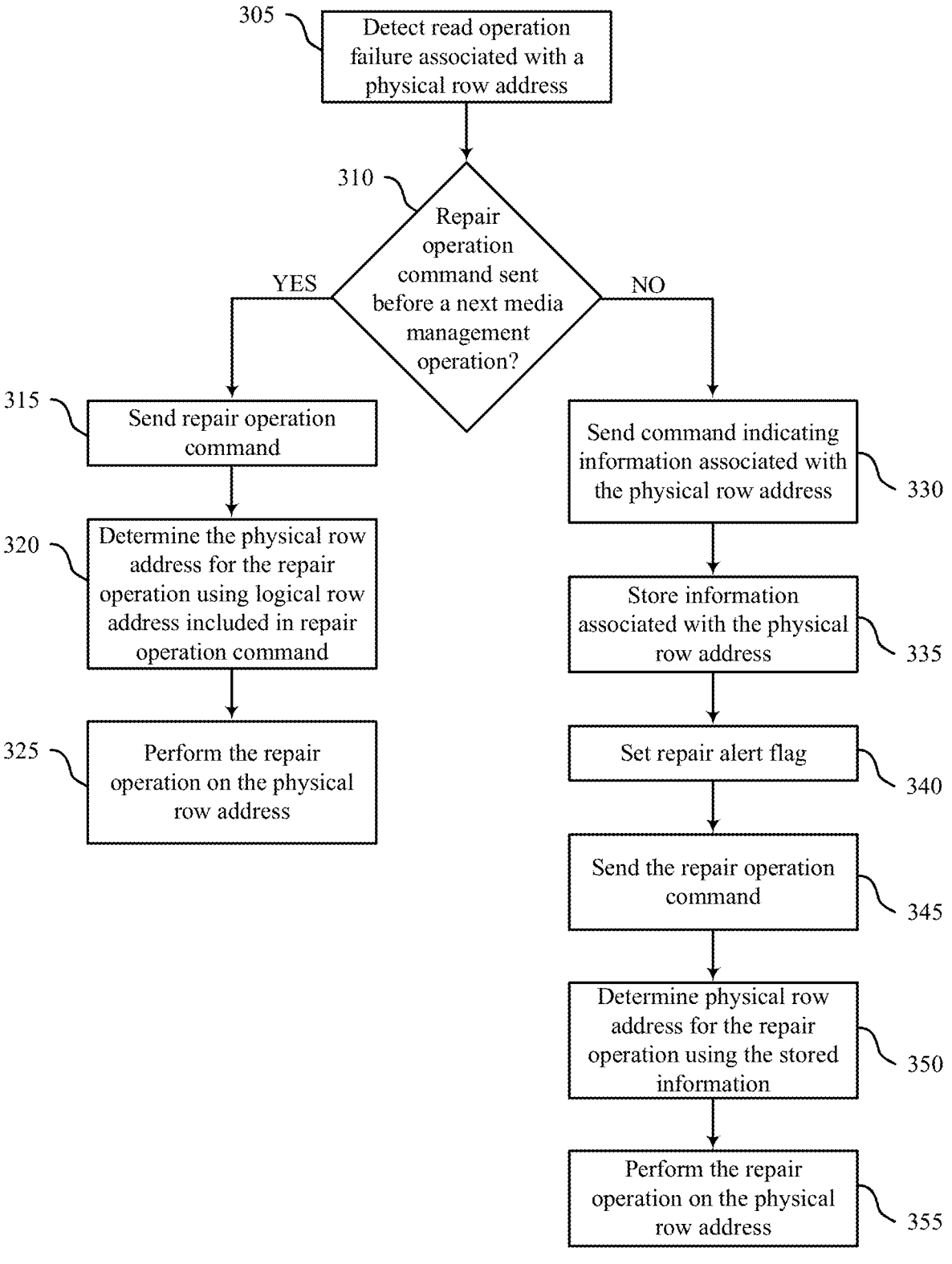

305 — Detect read operation failure associated with a physical row address

310 — Repair operation command sent before a next media management operation?

YES

315 — Send repair operation command

320 — Determine the physical row address for the repair operation using logical row address included in repair operation command 325 — Perform the repair operation on the physical row address

NO

330 — Send command indicating information associated with the physical row address 335 — Store information associated with the physical row address 340 — Set repair alert flag 345 — Send the repair operation command 350 — Determine physical row address for the repair operation using the stored information 355 — Perform the repair operation on the physical row address

FIG. 3     — 300

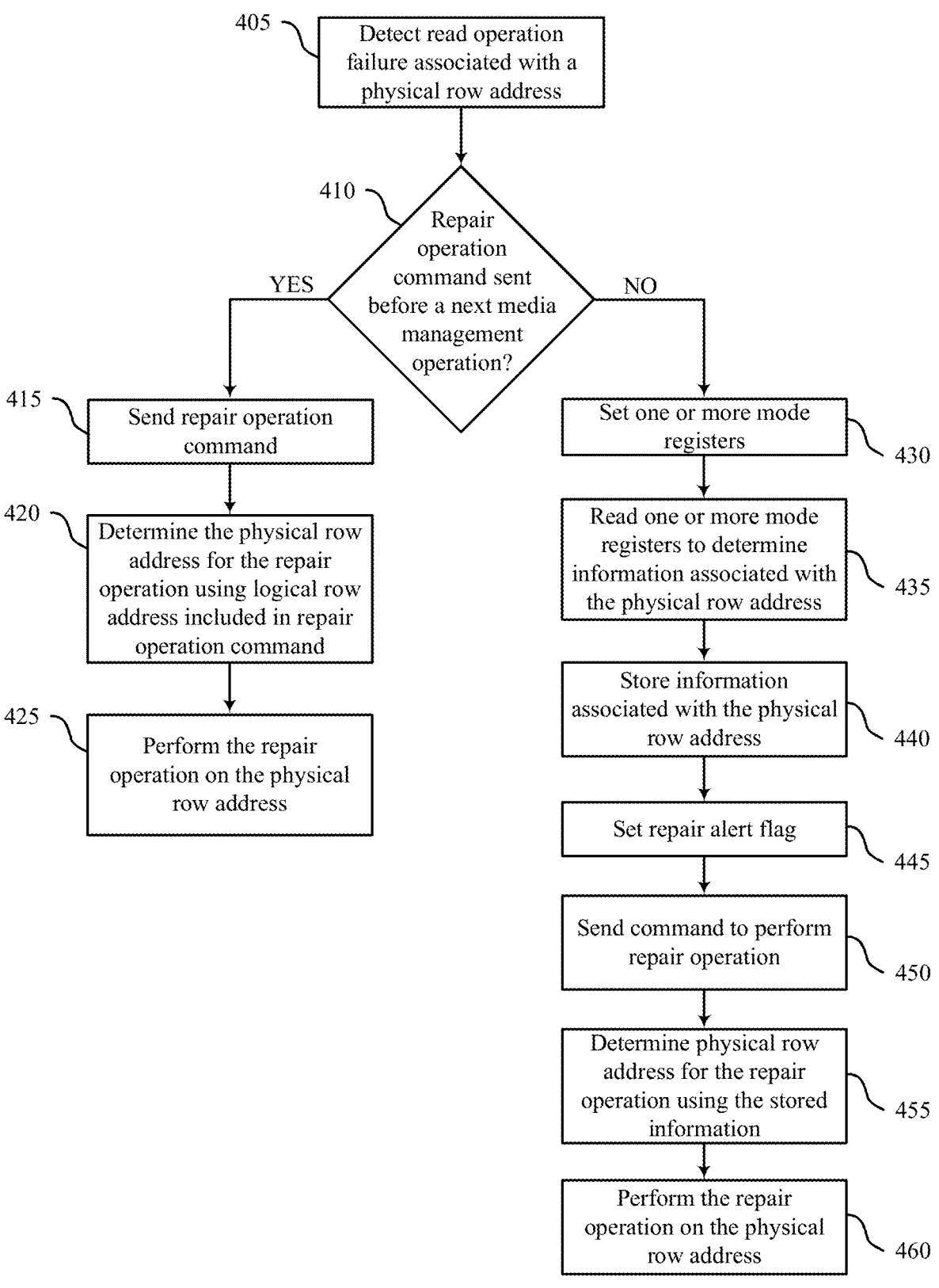
FIG. 4      400

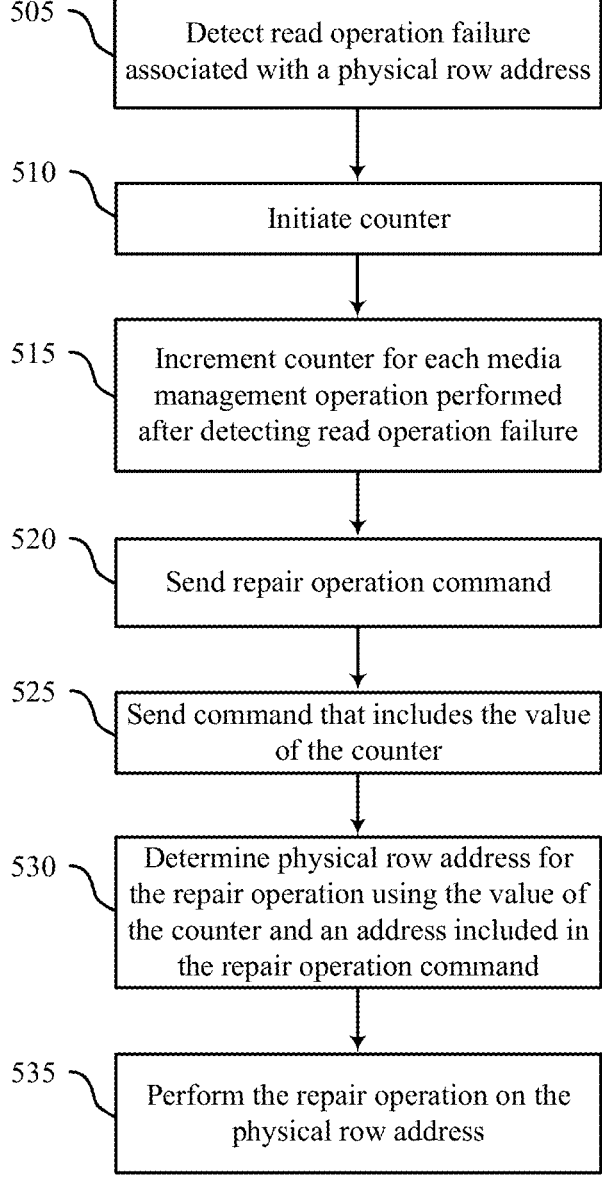

505 — Detect read operation failure associated with a physical row address

510 — Initiate counter

515 — Increment counter for each media management operation performed after detecting read operation failure 520 — Send repair operation command 525 — Send command that includes the value of the counter 530 — Determine physical row address for the repair operation using the value of the counter and an address included in the repair operation command 535 — Perform the repair operation on the physical row address

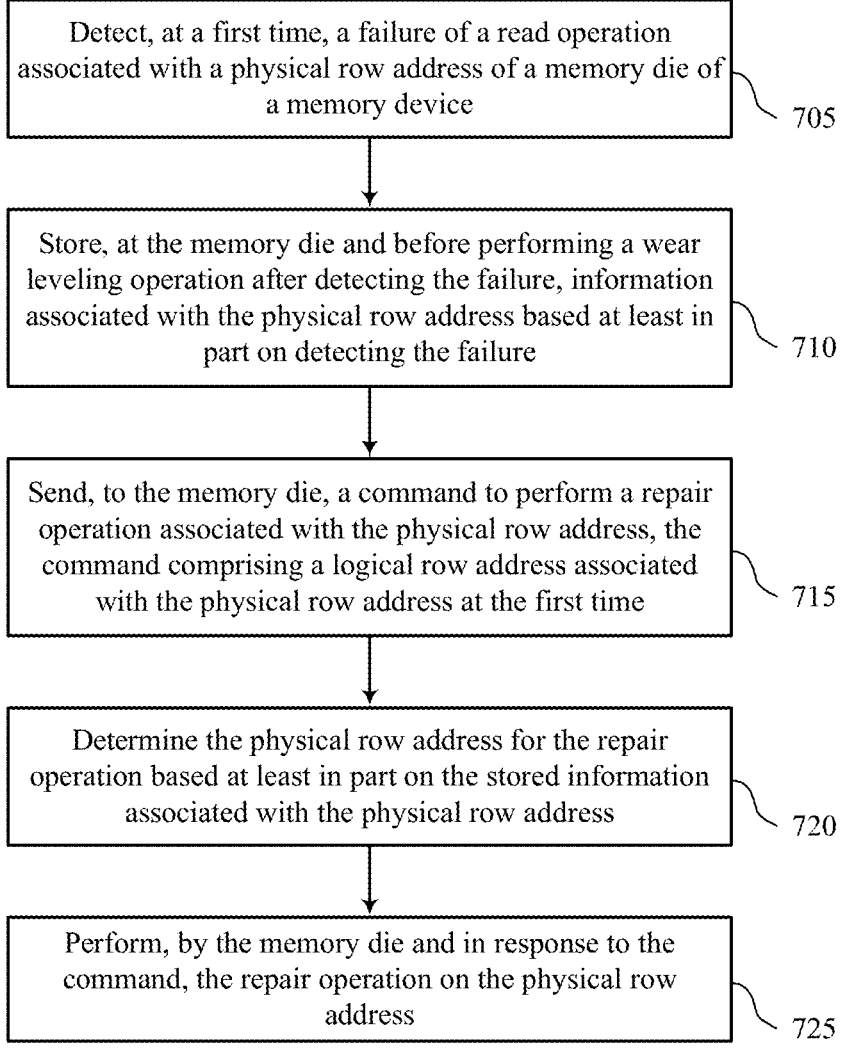

Detect, at a first time, a failure of a read operation associated with a physical row address of a memory die of a memory device ⟍ 705

Store, at the memory die and before performing a wear leveling operation after detecting the failure, information associated with the physical row address based at least in part on detecting the failure ⟍ 710

Send, to the memory die, a command to perform a repair operation associated with the physical row address, the command comprising a logical row address associated with the physical row address at the first time ⟍ 715

Determine the physical row address for the repair operation based at least in part on the stored information associated with the physical row address ⟍ 720

Perform, by the memory die and in response to the command, the repair operation on the physical row address ⟍ 725

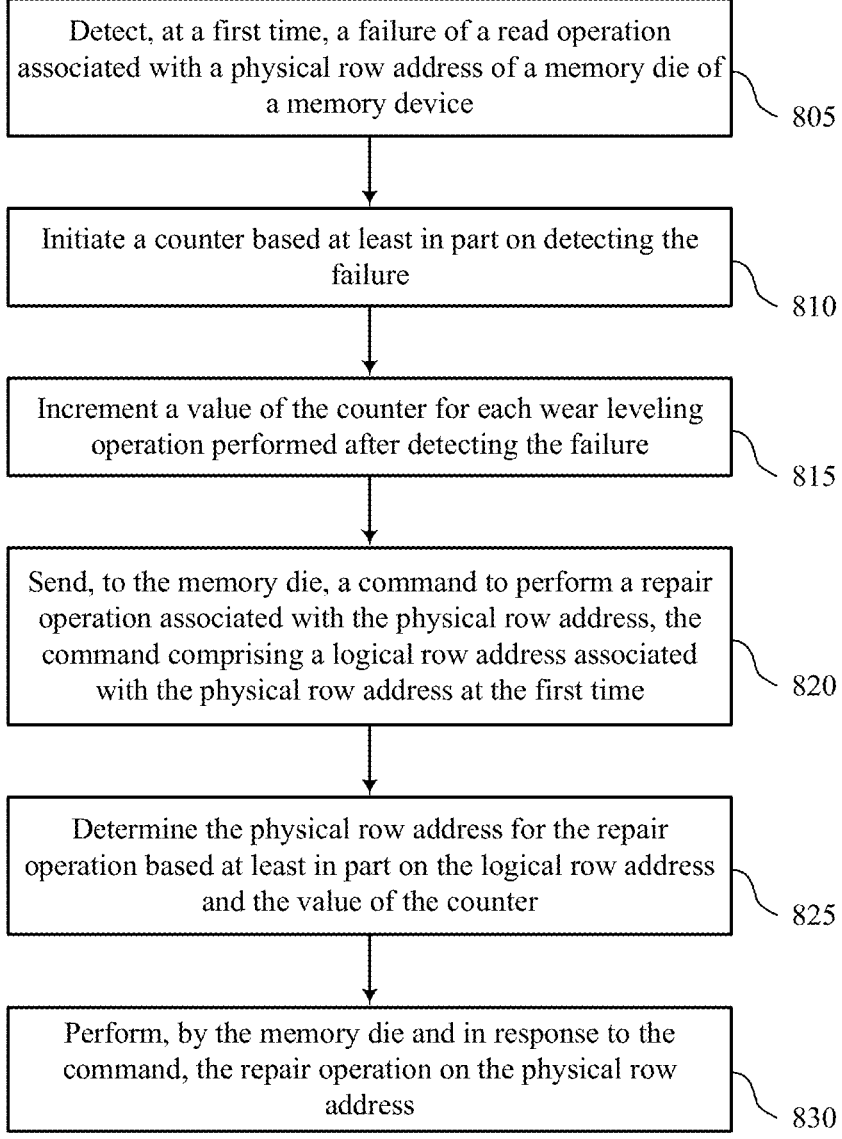

Detect, at a first time, a failure of a read operation associated with a physical row address of a memory die of a memory device

805

Initiate a counter based at least in part on detecting the failure

810

Increment a value of the counter for each wear leveling operation performed after detecting the failure

815

Send, to the memory die, a command to perform a repair operation associated with the physical row address, the command comprising a logical row address associated with the physical row address at the first time

820

Determine the physical row address for the repair operation based at least in part on the logical row address and the value of the counter

825

Perform, by the memory die and in response to the command, the repair operation on the physical row address

REPAIR OPERATION TECHNIQUES

CROSS REFERENCE

The present Application for Patent is a continuation of U.S. patent application Ser. No. 17/983,213 by Wilson et al., entitled "REPAIR OPERATION TECHNIQUES," filed Nov. 8, 2022, which is continuation of U.S. patent application Ser. No. 17/197,733 by Wilson et al., entitled "REPAIR OPERATION TECHNIQUES," filed Mar. 10, 2021, each of which is assigned to the assignee hereof, and each of which is expressly incorporated by reference in its entirety herein.

FIELD OF TECHNOLOGY

The following relates generally to one or more systems for memory and more specifically to repair operation techniques.

BACKGROUND

Memory devices are widely used to store information in various electronic devices such as computers, user devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source. FeRAM may be able to achieve densities similar to volatile memory but may have non-volatile properties due to the use of a ferroelectric capacitor as a storage device.

BRIEF DESCRIPTION OF THE DRAWINGS

FIGS. 2 through 5 illustrate examples of process flows that support repair operation techniques in accordance with examples as disclosed herein.

FIGS. 7 and 8 show flowcharts illustrating a method or methods that support repair operation techniques in accordance with examples as disclosed herein.

DETAILED DESCRIPTION

Figure 1:
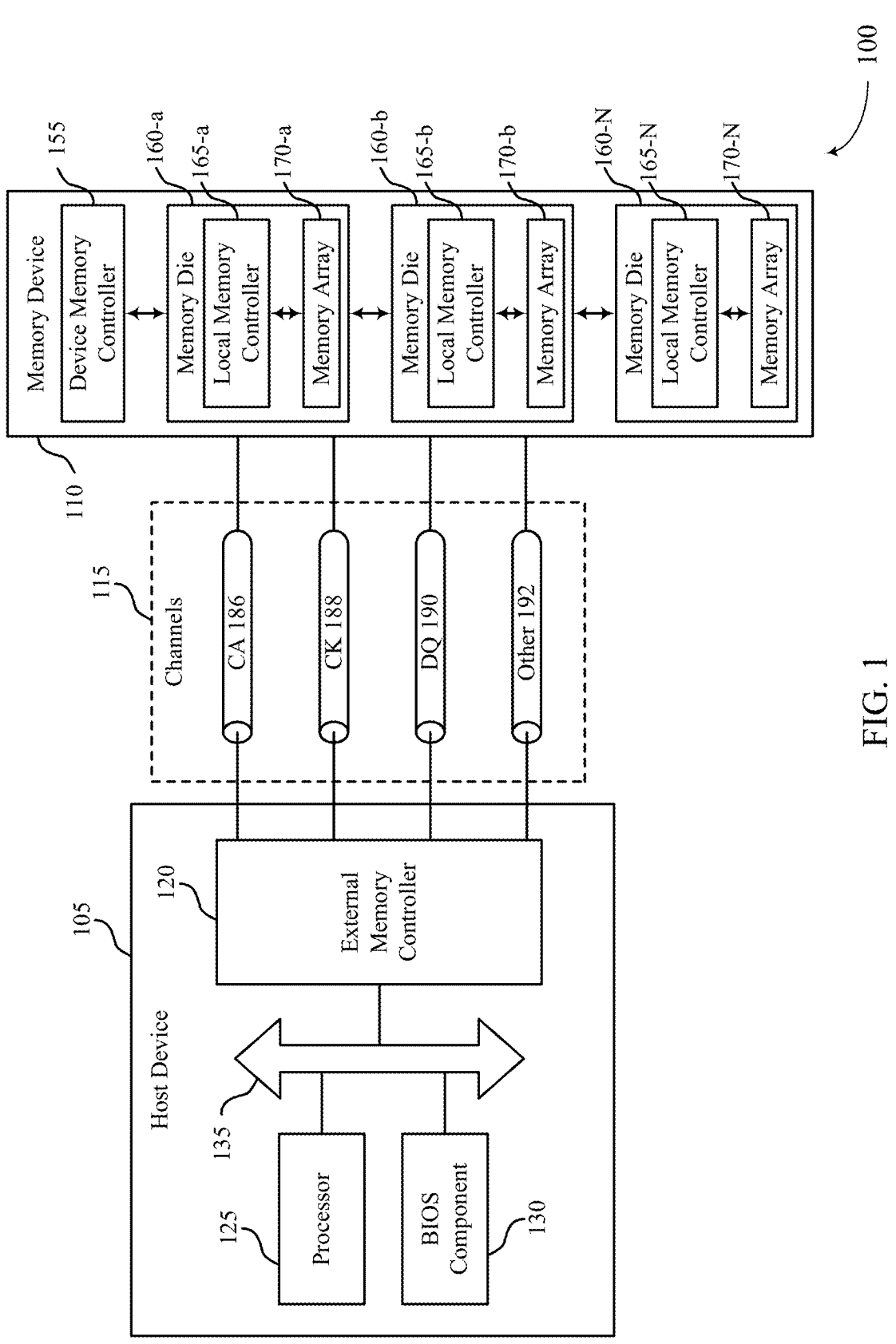
FIG. 1 illustrates an example of a system that supports repair operation techniques in accordance with examples as disclosed herein.

A memory device may perform repair operations in response to detecting a failure of an operation to access data stored in the memory device. For example, after detecting a failure of a read operation associated with a physical row address of a memory die of the memory device, the memory device may store a logical row address corresponding to the physical row address at the time of the failure. However, in some cases, before performing a repair operation to replace the failed physical row address, the memory device may perform one or more media management operations (e.g., wear leveling operations, garbage collection operations, security operations, or other media management operations) in which a mapping of logical addresses (e.g., the logical row address) to physical addresses (e.g., the physical row address) may be updated. A command to perform the repair operation may include the stored logical row address that the memory device uses to determine the failed physical row address. But if, as a result of performing the one or more media management operations too soon, the mapping of the stored logical row address has changed to indicate a physical row address different than the failed physical row address, the memory device may repair an incorrect physical row address or otherwise fail to repair the failed physical row address.

Techniques, systems, and devices are described herein for improving the reliability of repair operations by performing one or more operations that enable accurate storage or generation of a failed physical row address. For example, based on detecting the failure associated with the physical row address and before performing a media management operation, the memory device may store information associated with the failed physical row address, for example, at the memory die (e.g., a local memory controller, one or more memory cells of a memory array, one or more mode registers, or a combination thereof). In some examples, the memory device may store the information at the memory die by sending a command or other information that indicates the information before performing the media management operation. For example, the memory device may send the command or the other information that includes the logical row address associated with the physical row address at the time of the failure. The memory die may generate the physical row address from the logical row address and may store the physical row address at the memory die. Alternatively, the memory device may send a command or other information that includes bank information associated with the physical row address and the memory die may store the bank information and information associated with mapping the logical row address to the physical row address at the time of the failure. In some examples, the memory device may set a mode register to indicate that a next command sent by the memory device will indicate the information. In some other examples, the memory device may set one or more mode registers to store the information, and the memory die may read the mode registers to determine and store the information. Accordingly, the memory device may send a command to perform a repair operation and the memory die may determine the failed physical row address using the stored information. By using the stored information to determine the physical row address (e.g., rather than the logical row address included in the command to perform the repair operation), the memory die may accurately determine the correct physical row address to repair, even if one or more media management operations have modified the logical-to-physical (L2P) mapping since the failure was detected.

Additionally, or alternatively, the memory device may initiate a counter based on detecting the failure and may increment a value of the counter for each media management operation performed after detecting the failure. The memory device may send the value of the counter with the command or other information to perform the repair operation, and the memory die may determine the failed physical row address using the logical row address included in the command or the other information to perform the repair operation and the value of the counter. For example, based on the value of the counter, the memory die may determine an L2P mapping at the time of the failure and may accurately determine the failed physical row address to repair using the indicated logical row address and the determined L2P mapping.

Features of the disclosure are initially described in the context of a system as described with reference to FIG. 1. Features of the disclosure are further described in the context of process flows as described with reference to FIGS. 2-5. These and other features of the disclosure are further illustrated by and described with reference to an apparatus diagram and flowcharts that relate to repair operation techniques as described with reference to FIGS. 6-8.

FIG. 1 illustrates an example of a system 100 that supports repair operation techniques in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a secondary or dependent-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies 160 may be referred to as a multi-die memory or a multi-die package or a multi-chip memory or a multi-chip package.

The memory die 160 may be an example of a two-dimensional (2D) array of memory cells or may be an example of a three-dimensional (3D) array of memory cells. A 2D memory die 160 may include a single memory array 170. A 3D memory die 160 may include two or more memory arrays 170, which may be stacked on top of one another or positioned next to one another (e.g., relative to a substrate). In some examples, memory arrays 170 in a 3D memory die 160 may be referred to as decks, levels, materials, or dies. A 3D memory die 160 may include any quantity of stacked memory arrays 170 (e.g., two high, three high, four high, five high, six high, seven high, eight high). In some 3D memory dies 160, different decks may share at least one common access line such that some decks may share one or more of a word line, a digit line, or a plate line.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device 110. Each channel 115 may include one or more signal paths or transmission mediums (e.g., conductors) between terminals associated with the components of the system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, the host device 105 may reference data stored in a memory die 160 or issue commands using logical addresses (e.g., logical block addresses (LBAs), logical row addresses, virtual addresses, system addresses, or other logical addresses). The memory device 110 (e.g., using the device memory controller 155 or a local memory controller 165) may generate and maintain an L2P mapping between the logical addresses and physical addresses of the memory dies 160 at which the data is stored or with which the commands are associated. The L2P mapping may support the memory device 110 or a memory die 160 changing the physical addresses over time. For example, the physical location of data within the memory device 110 may change over time due to the memory device 110 accommodating the writing of additional data, media management operations performed by the memory device 110 (e.g., wear leveling operations, security operations to move and protect data, garbage collection operations, unmap operations, or other media management operations), or for any other reasons. If the physical address of data is changed (e.g., the data is written to a new physical address) for any reason, the memory device 110 may update the L2P mapping (e.g., using the device memory controller 155 or a local memory controller 165) to map a logical address associated with the data to the new physical address of the data.

The memory device 110 (e.g., using the device memory controller 155 or a local memory controller 165) may perform a repair operation in response to detecting a failure of a read operation associated with a row of memory cells of a memory die 160. For example, after detecting the failure of the read operation, the memory device 110 may store (e.g., in the device memory controller 155) a logical row address corresponding to a physical row address of the failed row of memory cells at the time of the failure. However, in some cases, before performing a repair operation to replace the failed physical row address, the memory device 110 may perform one or more media management operations that involve updating the L2P mapping for one or more memory dies 160. A command to perform the repair operation may include the stored logical row address that the memory die 160 uses to determine the failed physical row address. But if, as a result of performing the one or more media management operations, the mapping of the stored logical row address has changed to indicate a physical row address different than the failed physical row address, the memory die 160 may repair an incorrect physical row address. Further, the likelihood that the stored logical row address no longer maps to the failed physical row address may increase with each additional media management operation.

To improve the reliability of repair operations, the memory device 110 may perform one or more operations that enable the storing or generation of a failed physical row address. The described techniques may be used to improve repair operations in any memory system or memory device that changes an L2P mapping over time. For example, after detecting the failure associated with the physical row address of a memory die 160 and before performing a media management operation, the memory device 110 may store information associated with the failed physical row address at the memory die 160. In some examples, the memory device 110 may store the information at the memory die 160 by sending a command that indicates the information before performing the media management operation. For example, the memory device 110 may send a command to the memory die 160 that includes the logical row address associated with the physical row address at the time of the failure. The memory die 160 may generate (e.g., via a local memory controller 165) the physical row address from the logical row address and may store the physical row address at the memory die 160. Alternatively, the memory device 110 may send a command that includes bank information associated with the physical row address and the memory die 160 may store the bank information and information associated with mapping the logical row address to the physical row address at the time of the failure. Accordingly, the memory device 110 may send a command to perform a repair operation and the memory die 160 may determine the failed physical row address using the stored information to ensure that the correct physical row address is determined and repaired.

Additionally, or alternatively, the memory device 110 may initiate a counter (e.g., at the device memory controller 155) based on detecting the failure and may increment a value of the counter for each media management operation performed after detecting the failure. If sending the command to perform the repair operation, the memory device 110 may additionally send the value of the counter, and the memory die 160 may determine (e.g., using the local memory controller 165) the failed physical row address using the logical row address included in the command and the value of the counter. By using both the logical row address and the value of the counter, the memory die 160 may ensure that the correct physical row address is determined and repaired.

Figure 2:
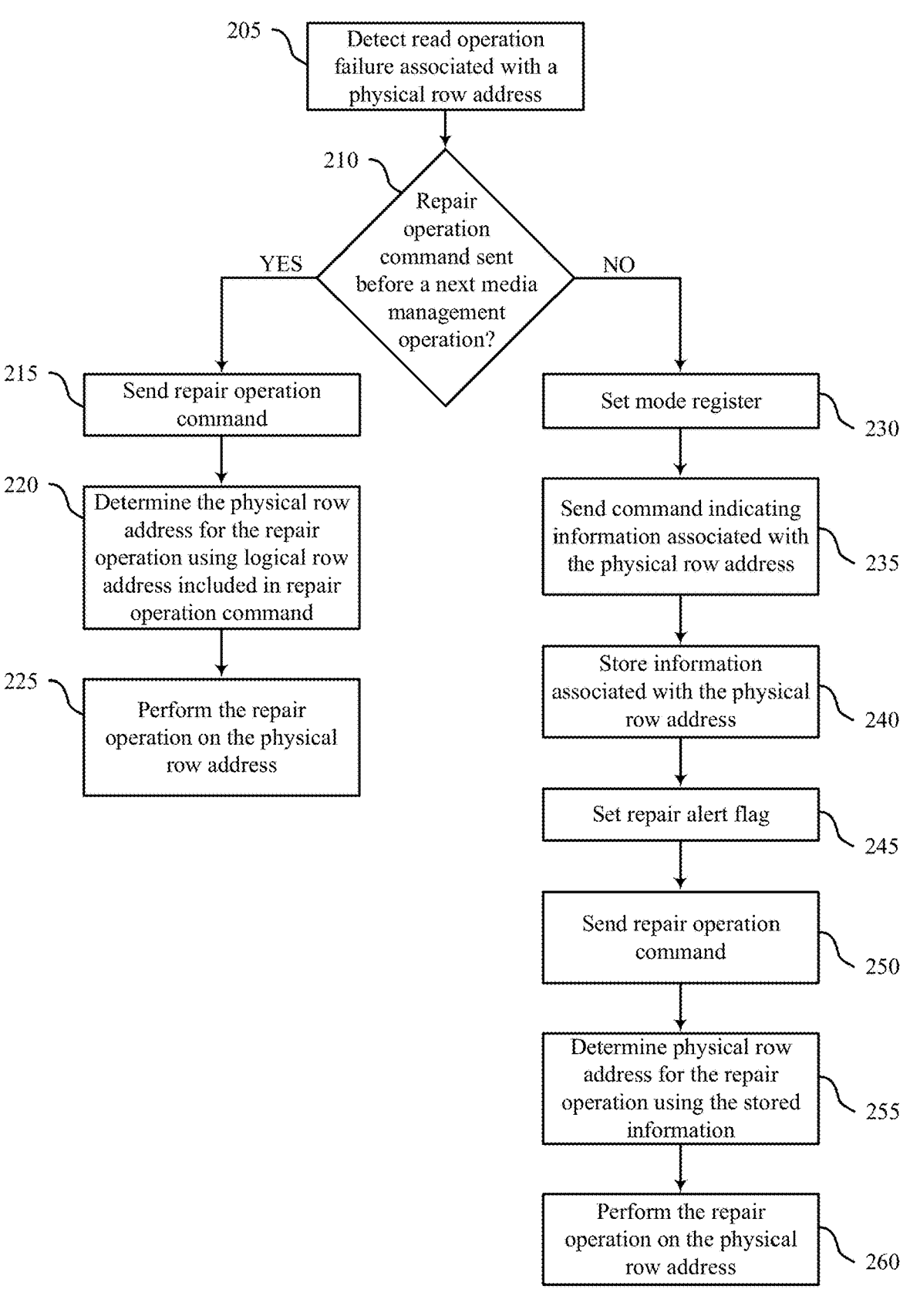

FIG. 2 illustrates an example of a process flow 200 that supports repair operation techniques in accordance with examples as disclosed herein. Process flow 200 may be performed by components of a system 100 described with reference to FIG. 1. For example, process flow 200 may be performed by a memory device and a memory die such as a memory device 110 and a memory die 160 as described with reference to FIG. 1, respectively. Process flow 200 may depict a process for determining a correct physical row address for a repair operation (e.g., even if an L2P mapping is modified based on one or more media management operations, such as wear leveling). Process flow 200 may be implemented to reduce failures and increase reliability and system performance, among other benefits.

In the following description of the process flow 200, the operations may be performed in different orders or at different times. Some operations may also be omitted from the process flow 200, and other operations may be added to the process flow 200.

At 205, the memory device or the memory die may detect a failure of a read operation associated with a physical row address. For example, a host device coupled with the memory device may send a read command that includes a logical row address that maps to the physical row address. In this example, the memory device may attempt and fail to read the data at the corresponding physical row address, for example, due to degradation of memory cells associated with the physical row address. In response to detecting the failure, the memory device may store the logical row address included in the read command (e.g., at a controller of the memory device) to include in a subsequent command to perform a repair operation on the failed physical row address.

At 210, the memory device or the memory die may determine whether the repair operation command is sent before a next media management operation. For example, the memory device may track a wear leveling cycle and may determine whether the repair operation command is scheduled to be sent prior to performing the next wear leveling operation (e.g., a media management operation). If the memory device sends the repair operation command before performing a media management operation after detecting the failure, the memory device may guarantee that the logical address included in the repair operation command still corresponds to the failed physical address. However, if the memory device or the memory die performs one or more media management operations before sending the repair operation command, the memory device or the memory die may update an L2P mapping such that, in some cases, the logical row address stored at the time of the failure may map to a different physical row address at the time the memory device sends the repair operation command.

Accordingly, if at 210, the memory device determines to send the repair operation command before performing the next media management operation, the memory device and the memory die may perform 215 through 225, as follows.

At 215, the memory device may send the repair operation command to the memory die. The repair operation command may include the logical row address that was stored at the time of detecting the failure. In some examples, the repair operation command may be an example of a post package repair (PPR) command.

At 220, the memory die may determine the failed physical row address from the logical row address included in the repair operation command. For example, the memory die may use the current L2P mapping to map the logical row address to the corresponding physical row address. Because the memory device sent the repair operation command before performing a next media management operation, the current L2P mapping may be the same as the L2P mapping at the time that the failure was detected, such that the logical row address maps to the failed physical row address.

At 225, the memory die may perform the repair operation on the determined physical row address. In some examples, the repair operation may include a PPR operation. For example, the memory die may replace the failed physical row address by disabling access to the failed physical row address and enabling access to a redundant or additional physical row address of the memory die.

If at 210, the memory device or the memory die determines that the repair operation command will be sent after at least the next media management operation, the memory device and the memory die may perform 230 through 260 as follows.

At 230, in response to detecting the failure, the memory device may set a mode register associated with the memory die to indicate to the memory die that a next command sent by the memory device indicates information associated with the failed physical row address. The memory device (e.g., using a device memory controller) may issue a ModeReg command including a PPR_ALERT activation indication to set the mode register. In some examples, the memory device may set a bit of the mode register to indicate that the next command includes the information associated with the failed physical row address.

At 235, the memory device may send the command indicating the information associated with the failed physical row address to the memory die. In some examples, the device memory controller of the memory device may issue the command. The memory device may send the command before performing the next media management operation. In some examples, the memory die may read the mode register to determine that the command indicates the information associated with the failed physical row address.

In some examples, the command may include the stored logical row address. For example, the memory device may send an activation (ACT) command that includes the stored logical row address. In some other examples, the command may include bank information associated with the failed physical row address. For example, the memory device may send a precharge (PRE) command that includes the bank information. In some cases, the bank information may include a first address of a bank group associated with the physical row address, a second address of a bank of the bank group that is associated with the physical row address, or a combination thereof.

At 240, the memory die may store the information indicated by the command (e.g., the ACT command or the PRE command). In some examples, the memory die may store the information in a local memory controller, one or more memory cells of a memory array, or a combination thereof. The information stored by the memory die may be based on the command. For example, if the command includes the stored logical row address, the memory die may generate the failed physical row address from the logical row address and store the failed physical row address. The memory die may use the current L2P mapping to generate the failed physical row address because the memory device sent the command prior to performing a next media management operation. In some examples, the memory die may determine that the command includes the stored logical row address based on the command being an ACT command.

Alternatively, if the command includes the bank information associated with physical row address, the memory die may store the bank information. Additionally the memory die may store second information that is associated with the L2P mapping at the time of detecting the failure. For example, the memory device may use a wear leveling engine to track how the L2P mapping changes over time. The wear leveling engine may use a counter such that a value of the counter indicates an L2P mapping at a particular time.

Accordingly, in response to receiving the command that includes the bank information, the memory die may additionally store a count associated with the current state of the wear leveling engine. For example, the memory die may store current offset and progress counter information for the wear leveling engine. Because the memory device sent the command before performing a media management operation, the stored count may correspond to the L2P mapping at the time of detecting the failure. In some examples, the memory die may determine that the command includes the bank information based on the command being a PRE command.

By using a mode register command and an ACT or PRE command, the memory device may store the information associated with the failed physical row address with a relatively low latency (e.g., below a threshold latency). Such a relatively low latency may allow the memory device to trigger the process for storing the information prior to performing the next media management operation after detecting the failed physical row address. Accordingly, the memory device may mitigate the risk associated with modifying an L2P mapping based on performing media management operations and may maintain a process for identifying the failed physical row address even if the L2P mapping changes.

At 245, the memory device or the memory die may set a repair alert flag (e.g., a "PPR Alert Flag") that indicates whether the memory die stored the information associated with the failed physical row address. For example, the memory device or the memory die may set the repair alert flag to indicate that the memory die stored the information associated with the failed physical row address and thus indicate to the memory die to use the stored information associated with the failed physical row address when performing the repair operation.

At 250, the memory device may send the repair operation command to the memory die. For example, a device memory controller at the memory device may issue a PPR command. In some cases, the memory device or the memory die may perform one or more media management operations between storing the information associated with the failed physical row address and sending the repair operation command. Accordingly, in some cases, the logical row address stored at the device memory controller and included in the repair operation command may no longer map to the failed physical row address.

At 255, the memory die may determine the failed physical row address for the repair operation using the stored information. The memory die may use the stored information to determine the failed physical row address based on determining that the repair alert flag is set. For example, upon receiving the repair operation command, the memory die may read the repair alert flag to determine that the memory die previously stored the information associated with the failed physical row address and may use the stored information to determine the failed physical row address. Alternatively, if the repair alert flag is not set (e.g., if a value of the repair alert flag indicates that the memory die did not previously store information associated with the failed physical row address), the memory die may perform 220 and 225 described above.

The memory die may determine the failed physical row address based on the type of information that was stored. For example, if at 240, the memory die stored the failed physical row address that was generated using the logical row address, the memory die may use the stored failed physical row address for the repair operation. Alternatively, if at 240, the memory die stored the bank information and the value of the counter of the wear leveling engine, the memory die may set the wear leveling engine to the stored value of the counter (e.g., the offset and progress counter information) so that the wear leveling engine may correspond to the L2P mapping at the time of detecting the failure. The memory die may use the wear leveling engine and the stored bank information to determine the failed physical row address. In some examples, the memory die may reset the wear leveling engine to the current value of the counter after determining the failed physical row address. In some other examples, the memory die may reset the wear leveling engine after performing the repair operation.

At 260, the memory die may perform the repair operation on the determined physical row address (i.e., the failed physical row address). In some examples, the repair operation may include a PPR operation.

FIG. 3 illustrates an example of a process flow 300 that supports repair operation techniques in accordance with examples as disclosed herein. Process flow 300 may be performed by components of a system 100 described with reference to FIG. 1. For example, process flow 300 may be performed by a memory device and a memory die such as a memory device 110 and a memory die 160 as described with reference to FIG. 1, respectively. Process flow 300 may depict a process for determining a correct physical row address for a repair operation. Process flow 300 may be implemented to reduce failures and increase reliability and system performance, among other benefits.

In the following description of the process flow 300, the operations may be performed in different orders or at different times. Some operations may also be omitted from the process flow 300, and other operations may be added to the process flow 300.

At 305, the memory device or the memory die may detect a failure of a read operation associated with a physical row address. In response to detecting the failure, the memory device may store a logical row address (e.g., at a controller of the memory device) that maps to the failed physical row address at the time of detecting the failure.

At 310, the memory device or the memory die may determine whether a repair operation command for the failed physical row address is to be sent before a next media management operation. If, at 310, the memory device determines to send the repair operation command before performing the next media management operation, the memory device and the memory die may perform 315 through 325, as follows.

At 315, the memory device may send the repair operation command (e.g., a PPR command) including the stored logical row address to the memory die that includes the failed physical row. At 320, the memory die may determine the failed physical row address from the logical row address included in the repair operation command. At 325, the memory die may perform the repair operation on the determined physical row address.

If at 310, the memory device or the memory die determines that the repair operation command will not be sent before the next media management operation, the memory device and the memory die may perform 330 through 355 as follows.

At 330, the memory device may send a command that indicates information associated with the failed physical row address to the memory die. The memory device may send the command before performing the next media management operation. The memory device may set a bit of the command to indicate to the memory die that the command includes the information associated with the failed physical row address. In some examples, the command (e.g., an ACT command) may include the stored logical row address. In some other examples, the command (e.g., a PRE command) may include bank information associated with the failed physical row address.

At 335, the memory die may store the information indicated by the command based on the command. For example, if the command includes the stored logical row address, the memory die may generate the failed physical row address from the logical row address and store the failed physical row address. Alternatively, if the command includes the bank information associated with physical row address, the memory die may store the bank information. Additionally the memory die may store second information that is associated with the L2P mapping at the time of detecting the failure. For example, the memory die may additionally store a value of a counter of a wear leveling engine (e.g., current offset and progress counter information). In some examples, the memory die may store the information associated with the failed physical row address based on the set bit of the command indicating that the command includes the information associated with the failed physical row address. For example, the set bit may indicate that the command is associated with a PPR alert.

At 340, the memory device or the memory die may set a repair alert flag that indicates for the memory die to use the stored information associated with the failed physical row address when performing the repair operation.

At 345, the memory device may send the repair operation command (e.g., PPR command) including the stored logical row address to the memory die. In some examples, the memory device or memory die may perform one or more media management operations (e.g., wear leveling operations) between storing the information associated with the failed physical row address and sending the repair operation command. Accordingly, in some cases, the logical row address indicated by the repair operation command may no longer map to the failed physical row address.

At 350, the memory die may determine the failed physical row address for the repair operation using the stored information based on the repair alert flag indicating for the memory die to use the stored information. Alternatively, if the repair alert flag is not set (e.g., indicating that the memory die did not previously store information associated with the failed physical row address), the memory die may perform 320 and 325 described above.

The memory die may determine the failed physical row address based on the type of information that was stored. For example, if at 335, the memory die stored the failed physical row address that was generated using the logical row address, the memory die may use the stored failed physical row address for the repair operation. Alternatively, if at 335, the memory die stored the bank information and the value of the counter of the wear leveling engine, the memory die may use the bank information and the stored value of the counter of the wear leveling engine to determine the failed physical row address. In some examples, the memory die may reset the wear leveling engine to the current value of the counter after determining the failed physical row address. In some other examples, the memory die may reset the wear leveling engine after performing the repair operation.

At 355, the memory die may perform the repair operation (e.g., a PPR operation) on the determined physical row address (i.e., the failed physical row address).

FIG. 4 illustrates an example of a process flow 400 that supports repair operation techniques in accordance with examples as disclosed herein. Process flow 400 may be performed by components of a system 100 described with reference to FIG. 1. For example, process flow 400 may be performed by a memory device and a memory die such as a memory device 110 and a memory die 160 as described with reference to FIG. 1, respectively. Process flow 400 may depict a process for determining a correct physical row address for a repair operation. Process flow 400 may be implemented to reduce failures and increase reliability and system performance, among other benefits.

In the following description of the process flow 400, the operations may be performed in different orders or at different times. Some operations may also be omitted from the process flow 400, and other operations may be added to the process flow 400.

At 405, the memory device or the memory die may detect a failure of a read operation associated with a physical row address. In response to detecting the failure, the memory device may store a logical row address (e.g., at a controller of the memory device) that maps to the failed physical row address at the time of detecting the failure.

At 410, the memory device or the memory die may determine whether a repair operation command for the failed physical row address is to be sent before a next media management operation. If at 410, the memory device determines to send the repair operation command before performing the next media management operation, the memory device and the memory die may perform 415 through 425, as follows.

At 415, the memory device may send the repair operation command (e.g., PPR command) including the logical row address to the memory die. At 420, the memory die may determine the failed physical row address from the logical row address included in the repair operation command. At 425, the memory die may perform the repair operation on the determined physical row address.

If at 410, the memory device or the memory die determines that the repair operation command will not be sent before the next media management operation, the memory device and the memory die may perform 430 through 460 as follows.

At 430, the memory device may set, before performing the next media management operation, one or more mode registers associated with the memory die to store information associated with the failed physical row address. In some cases, a device memory controller of the memory device may issue a ModeReg command including an indication of a PPR alert activation to set the one or more mode registers. For example, the memory device may set the one or more mode registers to each store respective bits of the stored logical row address (i.e., the logical row address that maps to the failed physical row address at the time of detecting the failure). Alternatively, the memory device may set the one or more mode registers to store bank information associated with the failed physical row address. In some examples, the memory device may set a bit of one of the one or more mode registers to indicate to the memory die that the one or more mode registers store the information associated with the failed physical row address. In some cases, the memory device may set a second bit of one of the one or more mode registers to indicate whether the information stored by the one or more mode registers corresponds to the stored logical row address or to the bank information.

At 435, the memory die may read the one or more mode registers to determine the stored information associated with the failed physical row address. For example, the memory die may read the one or more registers to determine the stored logical row address. Alternatively, the memory die may read the one or more registers to determine the stored bank information.

At 440, if the information read from the one or more mode registers corresponds to the stored logical row address, the memory die may generate the failed physical row address from the logical row address and store the failed physical row address. Alternatively, if the information read from the one or more mode registers corresponds to the bank information, the memory die may store the bank information. Additionally, the memory die may store a value of a counter of a wear leveling engine (e.g., current offset and progress counter information) at the time of detecting the failure.

At 445, the memory device or the memory die may set a repair alert flag (e.g., a PPR alert flag) that indicates for the memory die to use the stored information associated with the failed physical row address when performing the repair operation.

At 450, the memory device may send the repair operation command (e.g., a PPR command) to the memory die. In some examples, the memory device may perform one or more media management operations between storing the information associated with the failed physical row address and sending the repair operation command. Accordingly, in some cases, the logical row address included in the repair operation command may no longer map to the failed physical row address.

At 455, the memory die may determine the failed physical row address for the repair operation using the stored information based on the repair alert flag indicating for the memory die to use the stored information. Alternatively, if the repair alert flag is not set (e.g., indicating that the memory die did not previously store information associated with the failed physical row address), the memory die may perform 420 and 425 described above.

The memory die may determine the failed physical row address based on the type of information that was stored. For example, if at 440, the memory die stored the failed physical row address that was generated using the logical row address, the memory die may use the stored failed physical row address for the repair operation. Alternatively, if at 440, the memory die stored the bank information and the value of the counter of the wear leveling engine, the memory die may use the bank information and the stored value of the counter of the wear leveling engine to determine the failed physical row address. In some examples, the memory die may reset the wear leveling engine to the current value of the counter after determining the failed physical row address. In some other examples, the memory die may reset the wear leveling engine after performing the repair operation.

At 460, the memory die may perform the repair operation (e.g., PPR operation) on the determined physical row address (i.e., the failed physical row address).

FIG. 5 illustrates an example of a process flow 500 that supports repair operation techniques in accordance with examples as disclosed herein. Process flow 500 may be performed by components of a system 100 described with reference to FIG. 1. For example, process flow 500 may be performed by a memory device and a memory die such as a memory device 110 and a memory die 160 as described with reference to FIG. 1, respectively. Process flow 500 may depict a process for determining a correct physical row address for a repair operation. Process flow 500 may be implemented to reduce failures and increase reliability and system performance, among other benefits.

In the following description of the process flow 500, the operations may be performed in different orders or at different times. Some operations may also be omitted from the process flow 500, and other operations may be added to the process flow 500.

At 505, the memory device or the memory die may detect a failure of a read operation associated with a physical row address. In response to detecting the failure, the memory device may store a logical row address (e.g., at a controller of the memory device) that maps to the failed physical row address at the time of detecting the failure.

At 510, the memory device or the memory die may initiate a counter. For example, in response to detecting the failure, the memory device may initiate, at a device memory controller, a counter to count a quantity of media management operations that are performed after detecting the failure. At 515, the memory device or the memory die may increment a value of the counter for each media management operation that is performed after detecting the failure. For example, the counter may track the quantity of wear leveling cycles (e.g., media management operations) performed after detecting the failure. In some examples, a media management operation that is performed on a bank that does not include the physical row address may not affect a mapping of the stored logical row address to the failed physical row address. Accordingly, in some examples, the memory device or the memory die may increment the value of the counter for each media management operation performed on a bank associated with (e.g., that includes) the failed physical row address.

At 520, the memory device may send a repair operation command to the memory die that includes the stored logical row address. At 525, the memory device may additionally send a command that includes the value of the counter at the time the memory device sends the repair operation command. In some examples, the repair operation command may be an ACT command (e.g., a PPR command). In some examples, the command that includes the value of the counter may be a PRE command. Alternatively, a single command may indicate both the repair operation and the value of the counter.

At 530, the memory die may determine the failed physical row address for the repair operation using the stored logical row address indicated by the repair operation command and the value of the counter. For example, the memory die may use the value of the counter to determine the count of a wear leveling engine at the time of detecting the failure. The memory die may use the wear leveling engine set to the count at the time of detecting the failure to determine the L2P mapping at the time of detecting the failure. Accordingly, the memory die may use the determined L2P mapping to determine the failed physical row address from the logical row address indicated by the repair operation command. In some examples, the memory die may reset the wear leveling engine to the current value of the counter after determining the failed physical row address. In some other examples, the memory die may reset the wear leveling engine after performing the repair operation.

At 535, the memory die may perform the repair operation on the determined physical row address (i.e., the failed physical row address).

Figure 6:
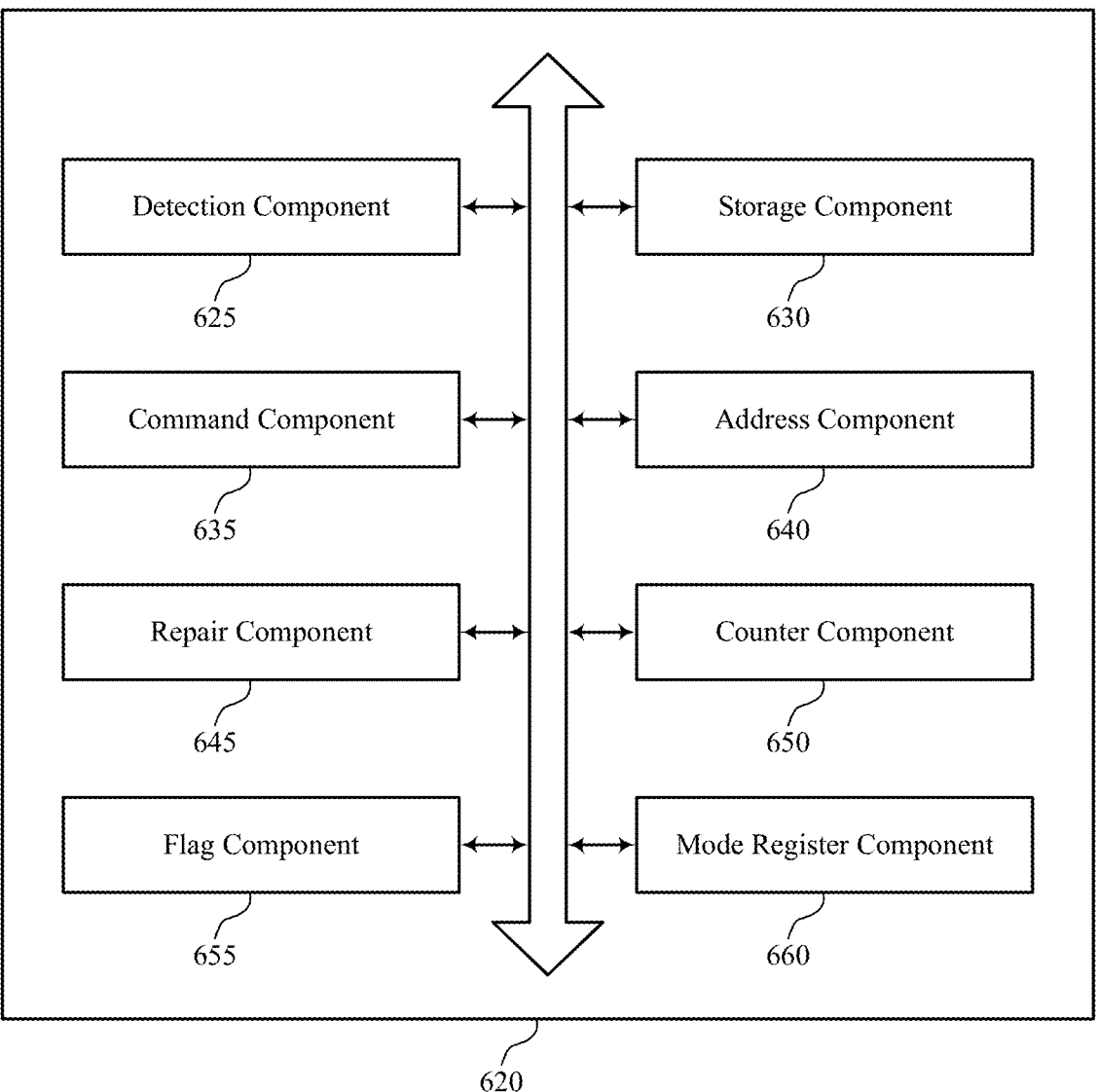
FIG. 6 shows a block diagram of a memory device that supports repair operation techniques in accordance with examples as disclosed herein.

FIG. 6 shows a block diagram 600 of a memory device 620 that supports repair operation techniques in accordance with examples as disclosed herein. The memory device 620 may be an example of aspects of a memory device as described with reference to FIGS. 1 through 5. The memory device 620, or various components thereof, may be an example of means for performing various aspects of repair operation techniques as described herein. For example, the memory device 620 may include a detection component 625, a storage component 630, a command component 635, an address component 640, a repair component 645, a counter component 650, a flag component 655, a mode register component 660, or any combination thereof. Each of these components may communicate, directly or indirectly, with one another (e.g., via one or more buses).

The detection component 625 may be configured as or otherwise support a means for detecting, at a first time, a failure of a read operation associated with a physical row address of a memory die of a memory device (e.g., the memory device 620). The storage component 630 may be configured as or otherwise support a means for storing, at the memory die and before performing a wear leveling operation after detecting the failure, information associated with the physical row address based at least in part on detecting the failure. The command component 635 may be configured as or otherwise support a means for sending, to the memory die, a command to perform a repair operation associated with the physical row address, the command including a logical row address associated with the physical row address at the first time. The address component 640 may be configured as or otherwise support a means for determining the physical row address for the repair operation based at least in part on the stored information associated with the physical row address. The repair component 645 may be configured as or otherwise support a means for performing, by the memory die and in response to the command, the repair operation on the physical row address.

In some examples, the flag component 655 may be configured as or otherwise support a means for setting a flag that indicates for the memory die to use the stored information associated with the physical row address for the repair operation, where determining the physical row address for the repair operation using the stored information associated with the physical row address is based at least in part on the set flag.

In some examples, the command component 635 may be configured as or otherwise support a means for sending, to the memory die and before performing the wear leveling operation, a second command indicating the information associated with the physical row address, where storing the information associated with the physical row address is based at least in part on the second command.

In some examples, the mode register component 660 may be configured as or otherwise support a means for setting, before sending the second command, a mode register associated with the memory die to indicate that the second command includes the information associated with the physical row address.

In some examples, the second command includes the logical row address associated with the physical row address at the first time. In some examples, to support storing the information associated with the physical row address, the address component 640 may be configured as or otherwise support a means for generating the physical row address from the logical row address. In some examples, to support storing the information associated with the physical row address, the storage component 630 may be configured as or otherwise support a means for storing the physical row address at the memory die.

In some examples, the second command is an ACT command.

In some examples, the second command includes bank information associated with the physical row address. In some examples, to support storing the information associated with the physical row address, the storage component

630 may be configured as or otherwise support a means for storing, at the memory die, the bank information associated with the physical row address. In some examples, to support storing the information associated with the physical row address, the storage component 630 may be configured as or otherwise support a means for storing, at the memory die, second information associated with a mapping of the logical row address to the physical row address at the first time.

In some examples, the second information includes a count of a wear leveling engine at the first time, the wear leveling engine used to map logical row addresses to physical row addresses.

In some examples, to support determining the physical row address for the repair operation, the address component 640 may be configured as or otherwise support a means for generating the physical row address using the stored bank information and the stored second information.

In some examples, the bank information includes a first address of a bank group associated with the physical row address, a second address of a bank of the bank group associated with the physical row address, or a combination thereof.

In some examples, the second command is a PRE command.

In some examples, the command component 635 may be configured as or otherwise support a means for setting a bit of the second command to indicate to the memory die that the second command includes the information associated with the physical row address, where storing the information associated with the physical row address is based at least in part on the set bit of the second command.

In some examples, the mode register component 660 may be configured as or otherwise support a means for setting, before performing the wear leveling operation, one or more mode registers associated with the memory die to each store a respective portion of the information associated with the physical row address.

In some examples, each mode register of the one or more mode registers stores respective bits of the logical row address associated with the physical row address at the first time. In some examples, to support storing the information associated with the physical row address, the mode register component 660 may be configured as or otherwise support a means for reading the one or more mode registers to determine the logical row address. In some examples, to support storing the information associated with the physical row address, the address component 640 may be configured as or otherwise support a means for generating, before performing the wear leveling operation after detecting the failure, the physical row address from the logical row address. In some examples, to support storing the information associated with the physical row address, the storage component 630 may be configured as or otherwise support a means for storing the physical row address at the memory die.

In some examples, the information associated with the physical row address includes bank information associated with the physical row address. In some examples, to support storing the information associated with the physical row address, the mode register component 660 may be configured as or otherwise support a means for reading the one or more mode registers to determine the bank information associated with the physical row address. In some examples, to support storing the information associated with the physical row address, the storage component 630 may be configured as or otherwise support a means for storing, at the memory die, the bank information associated with the physical row address. In some examples, to support storing the information associated with the physical row address, the storage component 630 may be configured as or otherwise support a means for storing, at the memory die, second information associated with a mapping of the logical row address to the physical row address at the first time.

In some examples, the detection component 625 may be configured as or otherwise support a means for detecting, at a first time, a failure of a read operation associated with a physical row address of a memory die of a memory device. The counter component 650 may be configured as or otherwise support a means for initiating a counter based at least in part on detecting the failure. In some examples, the counter component 650 may be configured as or otherwise support a means for incrementing a value of the counter for each wear leveling operation performed after detecting the failure. In some examples, the command component 635 may be configured as or otherwise support a means for sending, to the memory die, a command to perform a repair operation associated with the physical row address, the command including a logical row address associated with the physical row address at the first time. In some examples, the address component 640 may be configured as or otherwise support a means for determining the physical row address for the repair operation based at least in part on the logical row address and the value of the counter. In some examples, the repair component 645 may be configured as or otherwise support a means for performing, by the memory die and in response to the command, the repair operation on the physical row address.

In some examples, the command component 635 may be configured as or otherwise support a means for sending, to the memory die, a PRE command including the value of the counter. In some examples, to support determining the physical row address for the repair operation, the address component 640 may be configured as or otherwise support a means for generating, by the memory die, the physical row address for the repair operation using the logical row address sent in the command and the value of the counter sent in the PRE command.

In some examples, to support incrementing the value of the counter after detecting the failure, the counter component 650 may be configured as or otherwise support a means for incrementing the value of the counter for each wear leveling operation performed on a bank associated with physical row address of the memory die.

In some examples, the command to perform the repair operation is an ACT command including the logical row address.

FIG. 7 shows a flowchart illustrating a method 700 that supports repair operation techniques in accordance with examples as disclosed herein. The operations of method 700 may be implemented by a memory device or its components as described herein. For example, the operations of method 700 may be performed by a memory device as described with reference to FIGS. 1 through 6. In some examples, a memory device may execute a set of instructions to control the functional elements of the device to perform the described functions. Additionally or alternatively, the memory device may perform aspects of the described functions using special-purpose hardware.

At 705, the method may include detecting, at a first time, a failure of a read operation associated with a physical row address of a memory die of a memory device. The operations of 705 may be performed in accordance with examples as disclosed herein. In some examples, aspects of the operations of 705 may be performed by a detection component 625 as described with reference to FIG. 6.

At 710, the method may include storing, at the memory die and before performing a wear leveling operation after detecting the failure, information associated with the physical row address based at least in part on detecting the failure. The operations of 710 may be performed in accordance with examples as disclosed herein. In some examples, aspects of the operations of 710 may be performed by a storage component 630 as described with reference to FIG. 6.

At 715, the method may include sending, to the memory die, a command to perform a repair operation associated with the physical row address, the command including a logical row address associated with the physical row address at the first time. The operations of 715 may be performed in accordance with examples as disclosed herein. In some examples, aspects of the operations of 715 may be performed by a command component 635 as described with reference to FIG. 6.

At 720, the method may include determining the physical row address for the repair operation based at least in part on the stored information associated with the physical row address. The operations of 720 may be performed in accordance with examples as disclosed herein. In some examples, aspects of the operations of 720 may be performed by an address component 640 as described with reference to FIG. 6.

At 725, the method may include performing, by the memory die and in response to the command, the repair operation on the physical row address. The operations of 725 may be performed in accordance with examples as disclosed herein. In some examples, aspects of the operations of 725 may be performed by a repair component 645 as described with reference to FIG. 6.

In some examples, an apparatus as described herein may perform a method or methods, such as the method 700. The apparatus may include, features, circuitry, logic, means, or instructions (e.g., a non-transitory computer-readable medium storing instructions executable by a processor) for detecting, at a first time, a failure of a read operation associated with a physical row address of a memory die of a memory device, storing, at the memory die and before performing a wear leveling operation after detecting the failure, information associated with the physical row address based at least in part on detecting the failure, sending, to the memory die, a command to perform a repair operation associated with the physical row address, the command including a logical row address associated with the physical row address at the first time, determining the physical row address for the repair operation based at least in part on the stored information associated with the physical row address, and performing, by the memory die and in response to the command, the repair operation on the physical row address.

Some examples of the method 700 and the apparatus described herein may further include operations, features, circuitry, logic, means, or instructions for setting a flag that indicates for the memory die to use the stored information associated with the physical row address for the repair operation, where determining the physical row address for the repair operation using the stored information associated with the physical row address may be based at least in part on the set flag.

Some examples of the method 700 and the apparatus described herein may further include operations, features, circuitry, logic, means, or instructions for sending, to the memory die and before performing the wear leveling operation, a second command indicating the information associated with the physical row address, where storing the information associated with the physical row address may be based at least in part on the second command.

In some examples of the method 700 and the apparatus described herein, setting, before sending the second command, a mode register associated with the memory die to indicate that the second command includes the information associated with the physical row address.

In some examples of the method 700 and the apparatus described herein, the second command includes the logical row address associated with the physical row address at the first time. In some examples of the method 700 and the apparatus described herein, storing the information associated with the physical row address may include operations, features, circuitry, logic, means, or instructions for generating the physical row address from the logical row address and storing the physical row address at the memory die.

In some examples of the method 700 and the apparatus described herein, the second command may be an ACT command.

In some examples of the method 700 and the apparatus described herein, the second command includes bank information associated with the physical row address. In some examples of the method 700 and the apparatus described herein, storing the information associated with the physical row address may include operations, features, circuitry, logic, means, or instructions for storing, at the memory die, the bank information associated with the physical row address and storing, at the memory die, second information associated with a mapping of the logical row address to the physical row address at the first time.

In some examples of the method 700 and the apparatus described herein, the second information includes a count of a wear leveling engine at the first time, the wear leveling engine used to map logical row addresses to physical row addresses.

In some examples of the method 700 and the apparatus described herein, determining the physical row address for the repair operation may include operations, features, circuitry, logic, means, or instructions for generating the physical row address using the stored bank information and the stored second information.

In some examples of the method 700 and the apparatus described herein, the bank information includes a first address of a bank group associated with the physical row address, a second address of a bank of the bank group associated with the physical row address, or a combination thereof.

In some examples of the method 700 and the apparatus described herein, the second command may be a PRE command.

Some examples of the method 700 and the apparatus described herein may further include operations, features, circuitry, logic, means, or instructions for setting a bit of the second command to indicate to the memory die that the second command includes the information associated with the physical row address, where storing the information associated with the physical row address may be based at least in part on the set bit of the second command.

Some examples of the method 700 and the apparatus described herein may further include operations, features, circuitry, logic, means, or instructions for setting, before performing the wear leveling operation, one or more mode registers associated with the memory die to each store a respective portion of the information associated with the physical row address.

In some examples of the method 700 and the apparatus described herein, each mode register of the one or more mode registers stores respective bits of the logical row address associated with the physical row address at the first time. In some examples of the method 700 and the apparatus described herein, storing the information associated with the physical row address may include operations, features, circuitry, logic, means, or instructions for reading the one or more mode registers to determine the logical row address, generating, before performing the wear leveling operation after detecting the failure, the physical row address from the logical row address, and storing the physical row address at the memory die.

In some examples of the method 700 and the apparatus described herein, the information associated with the physical row address includes bank information associated with the physical row address. In some examples of the method 700 and the apparatus described herein, storing the information associated with the physical row address may include operations, features, circuitry, logic, means, or instructions for reading the one or more mode registers to determine the bank information associated with the physical row address, storing, at the memory die, the bank information associated with the physical row address, and storing, at the memory die, second information associated with a mapping of the logical row address to the physical row address at the first time.

FIG. 8 shows a flowchart illustrating a method 800 that supports repair operation techniques in accordance with examples as disclosed herein. The operations of method 800 may be implemented by a memory device or its components as described herein. For example, the operations of method 800 may be performed by a memory device as described with reference to FIGS. 1 through 6. In some examples, a memory device may execute a set of instructions to control the functional elements of the device to perform the described functions. Additionally or alternatively, the memory device may perform aspects of the described functions using special-purpose hardware.

At 805, the method may include detecting, at a first time, a failure of a read operation associated with a physical row address of a memory die of a memory device. The operations of 805 may be performed in accordance with examples as disclosed herein. In some examples, aspects of the operations of 805 may be performed by a detection component 625 as described with reference to FIG. 6.

At 810, the method may include initiating a counter based at least in part on detecting the failure. The operations of 810 may be performed in accordance with examples as disclosed herein. In some examples, aspects of the operations of 810 may be performed by a counter component 650 as described with reference to FIG. 6.

At 815, the method may include incrementing a value of the counter for each wear leveling operation performed after detecting the failure. The operations of 815 may be performed in accordance with examples as disclosed herein. In some examples, aspects of the operations of 815 may be performed by a counter component 650 as described with reference to FIG. 6.

At 820, the method may include sending, to the memory die, a command to perform a repair operation associated with the physical row address, the command including a logical row address associated with the physical row address at the first time. The operations of 820 may be performed in accordance with examples as disclosed herein. In some examples, aspects of the operations of 820 may be performed by a command component 635 as described with reference to FIG. 6.

At 825, the method may include determining the physical row address for the repair operation based at least in part on the logical row address and the value of the counter. The operations of 825 may be performed in accordance with examples as disclosed herein. In some examples, aspects of the operations of 825 may be performed by an address component 640 as described with reference to FIG. 6.

At 830, the method may include performing, by the memory die and in response to the command, the repair operation on the physical row address. The operations of 830 may be performed in accordance with examples as disclosed herein. In some examples, aspects of the operations of 830 may be performed by a repair component 645 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor) for detecting, at a first time, a failure of a read operation associated with a physical row address of a memory die of a memory device, initiating a counter based at least in part on detecting the failure, incrementing a value of the counter for each wear leveling operation performed after detecting the failure, sending, to the memory die, a command to perform a repair operation associated with the physical row address, the command including a logical row address associated with the physical row address at the first time, determining the physical row address for the repair operation based at least in part on the logical row address and the value of the counter, and performing, by the memory die and in response to the command, the repair operation on the physical row address.

Some examples of the method 800 and the apparatus described herein may further include operations, features, circuitry, logic, means, or instructions for sending, to the memory die, a PRE command including the value of the counter. In some examples of the method 700 and the apparatus described herein, determining the physical row address for the repair operation may include operations, features, circuitry, logic, means, or instructions for generating, by the memory die, the physical row address for the repair operation using the logical row address sent in the command and the value of the counter sent in the PRE command.

In some examples of the method 800 and the apparatus described herein, incrementing the value of the counter after detecting the failure may include operations, features, circuitry, logic, means, or instructions for incrementing the value of the counter for each wear leveling operation performed on a bank associated with the physical row address of the memory die.

In some examples of the method 800 and the apparatus described herein, the command to perform the repair operation may be an ACT command including the logical row address.

It should be noted that the methods described herein are possible implementations, and that the operations and the steps may be rearranged or otherwise modified and that other implementations are possible. Furthermore, portions from two or more of the methods may be combined.

Another apparatus is described. The apparatus may include a memory device including a memory die, a controller coupled with the memory device and configured to cause the apparatus to, detect, at a first time, a failure of a read operation associated with a physical row address of the memory die, store, at the memory die and before performing a wear leveling operation after detecting the failure, information associated with the physical row address based at least in part on detecting the failure, send, to the memory die, a command to perform a repair operation associated with the physical row address, the command including a logical row address associated with the physical row address at the first time, determine the physical row address for the repair operation based at least in part on the stored information associated with the physical row address, and perform, by the memory die and in response to the command, the repair operation on the physical row address.

In some examples of the apparatus, the controller may be further configured to cause the apparatus to set a flag that indicates for the memory die to use the stored information associated with the physical row address for the repair operation, where determining the physical row address for the repair operation using the stored information associated with the physical row address may be based at least in part on the set flag.

In some examples of the apparatus, the controller may be further configured to cause the apparatus to send, to the memory die and before performing the wear leveling operation, a second command indicating the information associated with the physical row address, where storing the information associated with the physical row address may be based at least in part on the second command.

In some examples of the apparatus, the controller may be further configured to cause the apparatus to set, before sending the second command, a mode register associated with the memory die to indicate that the second command includes the information associated with the physical row address.

In some examples of the apparatus, the second command includes the logical row address associated with the physical row address at the first time. In some examples of the apparatus, to store the information associated with the physical row address, the controller may be further configured to cause the apparatus to generate the physical row address from the logical row address and store the physical row address at the memory die.

In some examples of the apparatus, the second command is an ACT command.

In some examples of the apparatus, the second command includes bank information associated with the physical row address. In some examples of the apparatus, to store the information associated with the physical row address, the controller may be further configured to cause the apparatus to store, at the memory die, the bank information associated with the physical row address and store, at the memory die, second information associated with a mapping of the logical row address to the physical row address at the first time.

In some examples of the apparatus, the second information includes a count of a wear leveling engine at the first time, the wear leveling engine used to map logical row addresses to physical row addresses.

In some examples of the apparatus, to determine the physical row address for the repair operation, the controller may be further configured to cause the apparatus to generate the physical row address using the stored bank information and the stored second information.

In some examples of the apparatus, the bank information includes a first address of a bank group associated with the physical row address, a second address of a bank of the bank group associated with the physical row address, or a combination thereof.

In some examples of the apparatus, the second command is a PRE command.

In some examples of the apparatus, the controller may be further configured to cause the apparatus to set a bit of the second command to indicate to the memory die that the second command includes the information associated with the physical row address, where storing the information associated with the physical row address is based at least in part on the set bit of the second command.

In some examples of the apparatus, the controller may be further configured to cause the apparatus to set, before performing the wear leveling operation, one or more mode registers associated with the memory die to each store a respective portion of the information associated with the physical row address.

In some examples of the apparatus, each mode register of the one or more mode registers stores respective bits of the logical row address associated with the physical row address at the first time. In some examples of the apparatus, to store the information associated with the physical row address, the controller may be further configured to cause the apparatus to read the one or more mode registers to determine the logical row address, generate, before performing the wear leveling operation after detecting the failure, the physical row address from the logical row address, and store the physical row address at the memory die.

In some examples of the apparatus, the information associated with the physical row address includes bank information associated with the physical row address. In some examples of the apparatus, to store the information associated with the physical row address, the controller may be further configured to cause the apparatus to read the one or more mode registers to determine the bank information associated with the physical row address, store, at the memory die, the bank information associated with the physical row address, and store, at the memory die, second information associated with a mapping of the logical row address to the physical row address at the first time.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components from one another, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
initiating a counter at a first time and in response to a failure of a read operation associated with a physical row address;
incrementing a value of the counter for one or more media management operations performed after initiation of the counter; and
performing a repair operation on the physical row address based at least in part on the value of the counter and a logical row address associated with the physical row address at the first time.

2. The method of claim 1, further comprising:
storing, in response to the failure, the logical row address that maps to the physical row address at the first time.

3. The method of claim 2, wherein storing the logical row address comprises:
storing the logical row address of a controller of a memory device, wherein the memory device comprises the physical row address.

4. The method of claim 1, wherein the one or more media management operations comprise wear leveling cycles.

5. The method of claim 1, wherein incrementing the counter comprises:
incrementing the value of the counter in association with performance of the one or more media management operations on a first memory bank that includes the physical row address.

6. The method of claim 5, further comprising:
performing, after the first time, one or more second media management operations on a second memory bank different than the first memory bank, and wherein the one or more media management operations are exclusive of the one or more second media management operations.

7. The method of claim 1, further comprising:
sending, at a second time, a command to perform the repair operation associated with the physical row address, the command comprising the logical row address associated with the physical row address at the first time associated with the failure of the read operation, the command further comprising the value of the counter at the second time.

8. The method of claim 7, wherein the command comprises one of an activation command or a precharge command.

9. The method of claim 1, further comprising:
determining, using the value of the counter, a count of a wear leveling engine at the first time; and
determining, using the wear leveling engine set to the count, a logical address to physical address mapping for the physical row address at the first time, wherein performing the repair operation is based at least in part on the logical address to physical address mapping.

10. The method of claim 9, further comprising:
resetting, after determining the logical address to physical address mapping, the wear leveling engine to a current value of the counter.

11. An apparatus, comprising:
a memory device; and
a controller coupled with the memory device and configured to cause the apparatus to:
initiate, at a first time and in response to a failure of a read operation associated with a physical row address, a counter;
increment a value of the counter for one or more media management operations performed after initiation of the counter; and
perform a repair operation on the physical row address based at least in part on a logical row address associated with the physical row address at the first time and the value of the counter.

12. The apparatus of claim 11, wherein the controller is further configured to cause the apparatus to:
store, in response to the failure, the logical row address that maps to the physical row address at the first time.

13. The apparatus of claim 12, wherein to store the logical row address, the controller is further configured to cause the apparatus to:
store the logical row address of the controller of the memory device, wherein the memory device comprises the physical row address.

14. The apparatus of claim 11, wherein the one or more media management operations comprise wear leveling cycles.

15. The apparatus of claim 11, wherein to increment the counter, the controller is further configured to cause the apparatus to:
increment the value of the counter in association with performance of the one or more media management operations on a first memory bank that includes the physical row address.

16. The apparatus of claim 15, wherein the controller is further configured to cause the apparatus to:
perform, after the first time, one or more second media management operations on a second memory bank different than the first memory bank, and wherein the one or more media management operations are exclusive of the one or more second media management operations.

17. The apparatus of claim 11, wherein the controller is further configured to cause the apparatus to:
send, at a second time, a command to perform the repair operation associated with the physical row address, the command comprising the logical row address associated with the physical row address at the first time associated with the failure of the read operation, the command further comprising the value of the counter at the second time.

18. The apparatus of claim 17, wherein the command comprises one of an activation command or a precharge command.

19. The apparatus of claim 11, wherein the controller is further configured to cause the apparatus to:

determine, using the value of the counter, a count of a wear leveling engine at the first time; and determine, using the wear leveling engine set to the count, a logical address to physical address mapping for the physical row address at the first time, wherein performing the repair operation is based at least in part on the logical address to physical address mapping.

20. A non-transitory computer-readable medium storing code for wireless communications at a memory device, the code comprising instructions executable by one or more processors to:

initiate, at a first time and in response to a failure of a read operation associated with a physical row address, a counter;

increment a value of the counter for one or more media management operations performed after initiation of the counter; and perform a repair operation on the physical row address based at least in part on a logical row address associated with the physical row address at the first time and the value of the counter.

* * * * *